United States Patent [19]

Mazziotti

[11] Patent Number: 5,389,039

[45] Date of Patent: Feb. 14, 1995

[54] UNIVERSAL JOINT LUBRICANT RETAINER

[75] Inventor: Philip J. Mazziotti, Toledo, Ohio

[73] Assignee: The Zeller Corporation, Defiance, Ohio

[21] Appl. No.: 45,702

[22] Filed: Apr. 14, 1993

[51] Int. Cl.$^6$ ............................................. F16C 1/24
[52] U.S. Cl. ......................................... 464/14; 464/136; 403/36; 403/39; 403/38; 403/57; 403/74
[58] Field of Search .................. 403/36, 37, 38, 39, 403/57, 74, 53, 34; 464/11, 14

[56] References Cited

U.S. PATENT DOCUMENTS

| | | | |
|---|---|---|---|
| 3,832,865 | 9/1974 | Lewis | 403/39 |
| 4,650,440 | 3/1987 | Fisher | 464/14 |
| 4,710,150 | 12/1987 | Mangiavacchi | 464/14 |

FOREIGN PATENT DOCUMENTS

| | | | |
|---|---|---|---|
| 0157565 | 10/1985 | European Pat. Off. | 464/14 |
| 602784 | 9/1934 | Germany | 464/14 |
| 278317 | 12/1987 | Japan | 464/14 |
| 2112876 | 7/1983 | United Kingdom | 464/14 |
| 211965 | 4/1968 | U.S.S.R. | 464/14 |

*Primary Examiner*—Thomas E. Denion
*Attorney, Agent, or Firm*—Allen D. Gutchess, Jr.

[57] ABSTRACT

A lubrication system is set forth for a universal joint. A cross of the universal joint has four trunnions extending therefrom along two mutually perpendicular lines. Bearing cups are rotatably received on the ends of the trunnions and the cups, in turn, are held by universal joint yokes. Lubrication passages extend from a central portion of the cross outwardly to cavities located at the ends of the trunnions. A passage extension extends substantially through each cavity from the lubrication passage toward the end of the trunnion. A lubricant retainer is of generally inverted U-shaped configuration and extends over the passage extension. The retainer has openings near the bottom of the cavity and is centered in the cavity by a flange on the passage extension or by an outer flange at the edge of the retainer. The retainer prevents air from being trapped in the bottom of the cavity so that the cavity will always be filled with lubricant.

17 Claims, 2 Drawing Sheets

UNIVERSAL JOINT LUBRICANT RETAINER

This invention relates to the lubrication of universal joints.

A typical universal joint includes a cross having four trunnions extending outwardly therefrom along two mutually perpendicular lines. Bearing cups are received on the trunnions and rotatably mounted thereon, typically by needle bearings. The bearing cups in turn are held in pairs of arms of two mutually perpendicular yokes, each connected to a separate component in a drive train. Commonly, the cross has internal lubrication passages extending from a central portion thereof outwardly toward the ends of the trunnions, with a lubricant fitting located in the central portion and communicating with the four passages. When the universal joint is installed on a vehicle and has been in continuous operation for a period of time the lubricant, usually a grease, therein can be quite hot and correspondingly be of low viscosity. When the universal joint is stopped and remains stationary for a time, the lubricant can drain from one or two of the bearing cups in an upper position down through the cross passages and to the lower cups. When the vehicle is again started and the universal joint revolves, the upper cup or cups may be deprived of adequate lubrication for some period of time. The lubricant which has drained to the lower cup or cups is likely to remain there, particularly if the lubricant has cooled and has once again become relatively viscous or if the lubricant tends to be urged outwardly toward the cup or cups to which it is drained by virtue of centrifugal force due to rotation of the universal joint.

An attempt has been made to overcome this problem by placing a check valve device in each of the lubrication passages extending from the central portion of the cross to the trunnions. These were designed to enable lubricant to flow outwardly toward the trunnions but not in the opposite direction. However, lubricant in the central portion of the cross would not pass through the check valves to the trunnions under the force of gravity and even centrifugal force may not have been sufficient to overcome the resistance to the devices, at least in all instances. Also, when lubricant was forced into the passages through the central lubricant fitting, sometimes the lubricant would not reach all of the trunnions, particularly if a wide variation existed in the amount of force needed for the lubricant to pass various check valve devices. Also, occasionally such devices were deficient in their manufacture so that openings were not properly formed therethrough. In such an instance, no lubricant would ever pass through and the life of the universal joint was accordingly short The universal joint according to U.S. Pat. No. 3,832,865, issued Sep. 3, 1974, retains lubricant in the trunnions at the upper bearing cups when the universal joint is stationary and the lubricant is hot. However, there are no valves or similar restrictions involved which can cause such problems as those discussed above. Rather, the cross passages terminate in cavities at the ends of the trunnions and passage extensions communicate with those passages and extend substantially through the cavities to points near the ends of the trunnions. The passage extensions then hold lubricant in the annular spaces formed between the passage extensions and the internal surface of the cavities so that when the universal joint is rotated once again, the lubricant is present at such upper bearing cups to be available for lubrication almost immediately.

Before the cross and cups are assembled, lubricant is often placed in the cups for initial lubrication. In this instance, air can be trapped between the extension and the internal surface of the cavities. Also, when the cups are lubricated through an external lubrication or Zerk fitting, again air can be trapped between the extension and the internal surface of the cavities. In either case, the cavities will not be completely filled with lubricant.

To overcome this, in accordance with the invention, a retainer is placed over each of the passage extensions. The retainer is of generally inverted U-shaped configuration and extends downwardly over the passage extensions to the bottom of the cavity. The retainer has openings near the bottom of the cavity which communicate with the cavity and with space within the retainer around the passage extension. With the retainer, when lubricant is placed in the cup before assembly, it moves down around the retainer and through the openings and into the annular space around the passage extension, forcing air down the cross passage. When the lubricant is supplied through the Zerk fitting it moves through the passage extension, through the space around the extension, out the openings in the retainer, up through the cavity, and outwardly through the bearings, forcing any trapped air out through resilient seals at the open end of the cup.

It is, therefore, a principal object of the invention to provide a universal joint with lubrication provisions having the advantages and none of the disadvantages discussed above.

Another object of the invention is to provide a universal joint with a passage extension and lubricant retainer which eliminates trapped air in the cavity of the cross trunnion.

Many other objects and advantages of the invention will be apparent from the following detailed description of preferred embodiments thereof, reference being made to the accompanying drawings, in which.

Figure 1:
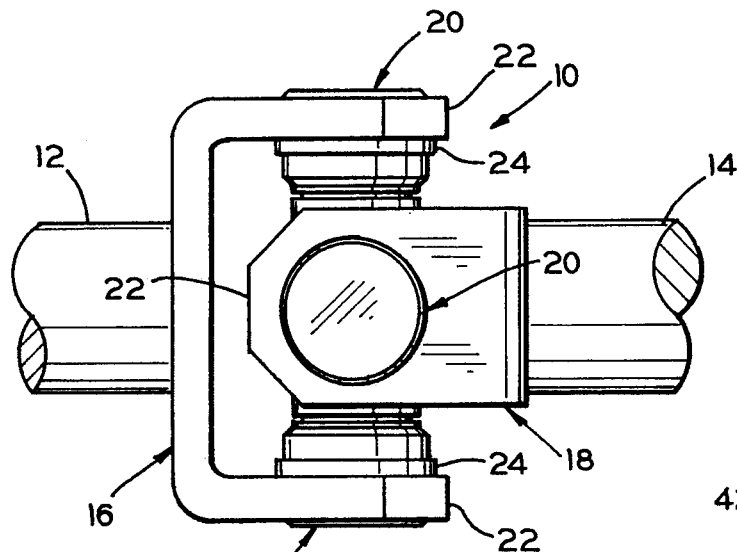
FIG. 1 is a somewhat schematic side view in elevation of a universal joint embodying the invention.

Referring to FIG. 1, a universal joint embodying the invention is indicated at 10 and connects driving and driven members 12 and 14 in the usual manner. The joint 10 includes two yokes 16 and 18 disposed at mutually perpendicular angles with bearing cups 20 held in arms 22 of the yokes 16 and 18 by retaining rings 24 or other suitable means.

Figure 2:
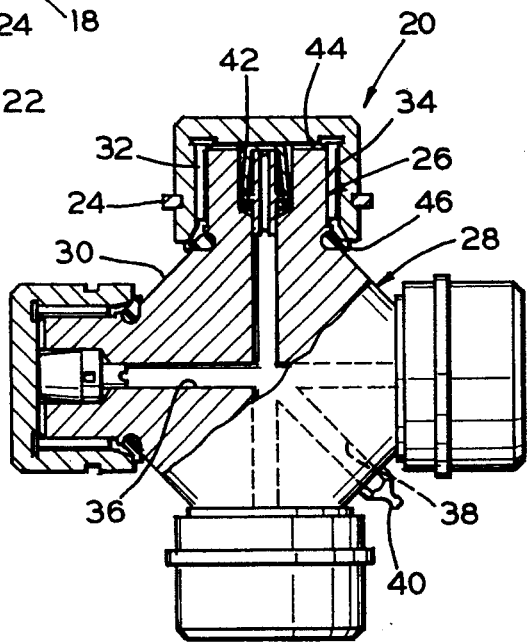
FIG. 2 is a front view in elevation of a cross and bearing cups of the universal joint, width parts broken away and with parts in cross section.

Referring more particularly to FIG. 2, the bearing cups 20 are rotatably mounted on trunnions 26 of a cross member 28 with the trunnions 26 extending outwardly from a body 30 of the cross member. Needle bearings 32 are located between the interior of the cups 20 and outer cylindrical bearing surfaces 34 of the trunnions 26.

Lubrication passages 36 extend outwardly from a central portion of the body 30 toward the trunnions 26. A supply passage 38 communicates with four lubrication passages 36 and terminates in an external lubrication fitting 40 by means of which grease or other suitable lubricant can be supplied to the passages 36 periodically. The passages 36 communicate with cavities or recesses 42 centrally located in the trunnions 26 so that lubricant can flow through the passages 36 and the cavities 42 to the interior of the cups 20. The ends of the trunnions 26 can have grooves 44 extending outwardly therefrom to aid in the passage of the lubricant, or plastic discs having grooves therein can be located between the trunnion ends and the cups. The lubricant travels outwardly through the grooves 44 to lubricate the needle bearings 32, with the lubricant being retained in the cups by resilient seals 46, which can be of a type shown in Zeller U.S. Pat. No. 3,091,948. Lubricant under pressure can also escape past the seals 46 so that older lubricant can be replaced by fresh lubricant during lubrication.

In universal joints heretofore known, after the vehicle with which the joint is used has been in operation for a period of time and is then stopped, one or even two of the trunnions 26 are in upper positions relative to the others. With the lubricant being hot due to the operation of the vehicle and the operation of the universal joint 10, it has a relatively low viscosity, with the result that the lubricant can drain down through the respective passages 36 and into the lower cup or cups. When the vehicle is again operated, the lubricant will have cooled off and become more viscous, tending to remain in the cup or cups to which it has drained. Further, centrifugal force acting on the universal joint 10 tends to retain the lubricant in that cup or cups. This results in the upper cup or cups not receiving lubrication, at least during initial resumed operation of the universal joint, with the result that wear is greatly accelerated.

Figure 3:
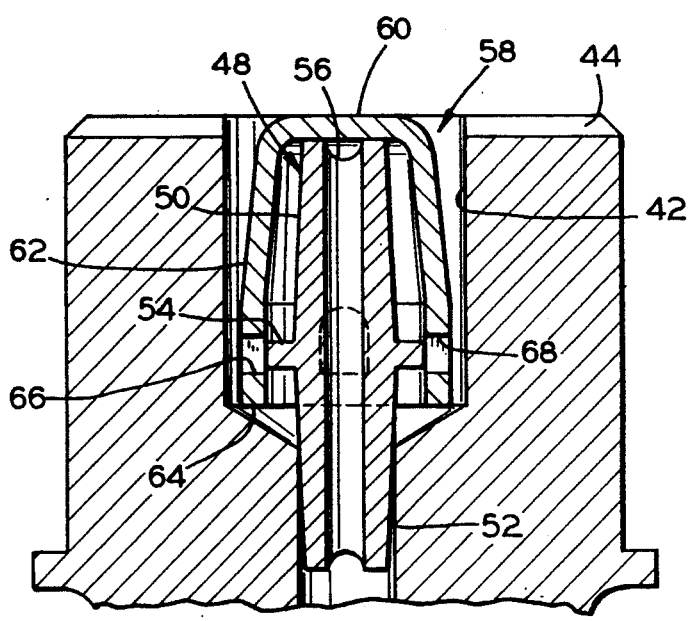
FIG. 3 is an enlarged fragmentary view in cross section of a trunnion, a passage extension, and a retainer of the universal joint of FIG. 2.

To overcome the above problem, a passage extension indicated at 48 is located in each of the cavities 42. Referring to FIG. 3 the passage extension 48 includes a tubular portion 50 which serves as an extension of the passage 36, extending into and substantially through the recess or cavity 42. The passage extension 48 has an end 50 which is frictionally received in the end of the lubrication passage 36. The passage extension 48 S further has a transversely extending annular flange 54 which helps center the extension in the cavity 42. The tubular portion 50 can also have short passages or notches 56 in the outer end thereof. In the event that the extension 48 should become loose in the passage 36 and move outwardly by centrifugal force, nevertheless the lubricant can still flow out of the extension.

When the passage extension 48 is used alone, as shown in the aforesaid U.S. Pat. No. 3,832,86S, air can be trapped in the bottom of the cavity 42 so that the cavity will not be completely filled with lubricant. Lubricant is often placed in the bearing cup for initial lubrication before the cross and cup are assembled. When they are assembled, air can then be trapped in the bottom of the cavity. Also, when the cups are lubricated through the external or Zerk fitting 40, air can be trapped at the bottom of the cavity when the lubricant exits the outer end of the passage extension 48. Again, the cavity will not be completely filled with lubricant.

Figure 4:
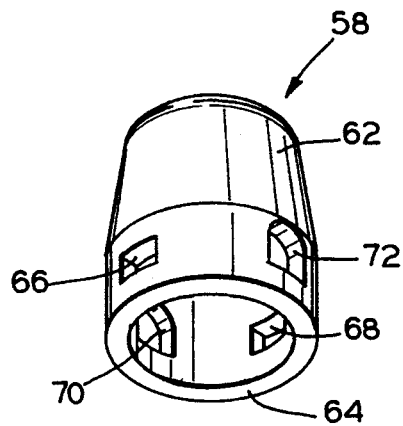
FIG. 4 is a view in perspective of the retainer.

In accordance with the invention, a lubricant retainer or cap 58 is placed over each of the passage extensions 48 in the cavities 42. The retainer 58 is of generally inverted U-shaped configuration and extends downwardly over the passage extension to the bottom of the cavity. The retainer 58 has a flat top wall 60 and a side wall 62 of circular configuration in transverse cross section. This side wall is shown as tapered but can also be cylindrical. It terminates in a circular bottom edge 64 located near the bottom of the cavity 42 when the top wall 60 contacts the outer end of the passage extension 48. Narrow, diametrically-opposite openings 66 and 68 are located near the lower edge of the retainer and larger openings 70 and 72 are also diametrically opposite the lower edge of the retainer, as best shown in FIG. 4. There can also be openings in the form of notches or slots in the bottom edge portion 64 of the retainer 58 and in the flange 54. It is only important that there be openings large enough to enable communication of the cavity 42 with the annular space between the passage extension 48 and the retainer 58 in the proximity of the flange 54.

The retainer 58 can fit snugly over the passage extension 48 and in contact with the flange 54 thereof. However, if there is a looser fit between the flange and retainer, the retainer is trapped in the cavity 42 by the bearing cup 20. In any event, flange 44, in this instance, centers the retainer 58 in the cavity 42. It may be desirable to have the flange 54 fit snugly in the retainer 58 and allow the passage of lubricant by slots or notches in the flange.

With the retainer 58 according to the invention, when lubricant is initially placed in the bearing cup before assembly, when the two are assembled, the lubricant moves down around the retainer 58, through the openings 66, 68 and 70, 72 or through openings in the lower edge of the retainer 58 and the flange as discussed previously. The lubricant then moves up through the annular space between the passage extension 48 and the side wall 62 of the retainer and forces air therein through the notches 56 and into the cross passage 26. This would normally be done with the lubrication fitting removed to allow it to vent.

When the lubricant is supplied through the Zerk fitting 40, it moves through the passage 36, through the passage extension 48 and out the notches 56. The lubricant then moves down through the space between the extension 48 and the side walls 62 of the retainer 58 and out the openings 66, 68 and 70, 72, or through openings in the lower edge of the retainer 58 and the flange 54, as discussed previously, and up through an annular space between the retainer 58 and the cavity 42. The lubricant can then move through the cross passages 44 to the bearings 32 and force any trapped air out through the resilient seals 46 at the open end of the cup 20. Thus, with either type of lubrication, or both, air which otherwise might be trapped at the bottom of the cavity 42 is forced back through the passage extension 48 and into the cross passage 36 or outwardly past the bearings 32 and past the seal 46. Thus, the cavity 42 and the retainer 58 are always filled with lubricant.

Figure 5:
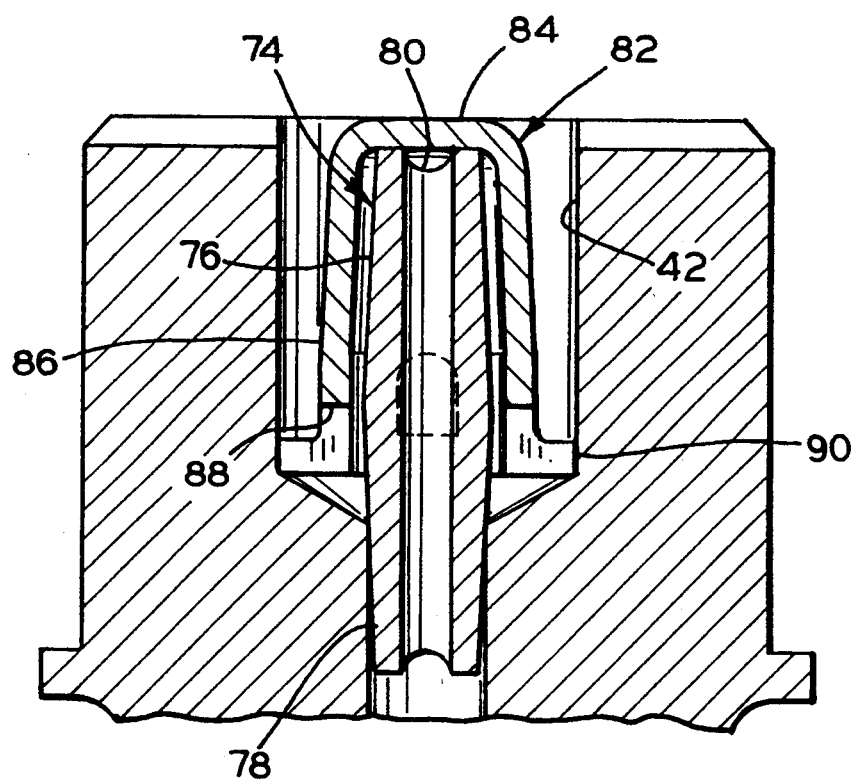
FIG. 5 is a view similar to FIG. 3 showing a slightly modified passage extension and retainer.

Referring now to FIG. 5, a slightly modified passage extension and lubricant retainer or cap are shown. Here a modified passage extension 74 has a tubular portion 76 and a portion 78 fitting into the cross passage 36. The extension also has outer notches 80. With both the passage extensions 48 and 74, the notches 56 and 80 can also be located at the inner ends of the extensions so that the extensions are symmetrical about a center line. With this arrangement, it is impossible to assemble the passage extensions in the passages incorrectly. In this instance, the passage extension 74 does not have to have any flange corresponding to the flange 54 of the extension 48.

A slightly modified lubricant retainer 82 is also of inverted U-shaped configuration and is made of a suitable metal or plastic material as is the retainer 58. The retainer 82 has a flat top wall 84 and a side wall 86 of circular transverse configuration. Suitable openings 88 are located near the lower end of the retainer 82 and are located near the bottom of the cavity. Since S there is no flange on the passage extension, the position and size of the openings 88 are less critical. At the lower edge of the lubricant retainer 82 is an annular flange 90 extending outwardly therefrom and into contact with the side wall of the cavity 42. The flange 90 serves to center the retainer in the cavity 42 and serves the function of the flange 54 of the passage 48. The fit of the annular flange 90 with the cavity 42 can be snug but it is not essential since the retainer 82 is trapped in the cavity by the cup.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A cross for a universal joint comprising a body forming four trunnions extending therefrom along two mutually perpendicular lines, passages in said body extending from a central portion thereof to locations near ends of said trunnions, a cavity in an end of each of said trunnions communicating with one of said passages, means for supplying lubricant to all of said passages and to said cavities, passage extensions communicating with said passages and extending into said cavities, said passage extensions terminating short of the ends of said trunnions, lubricant retainers in said cavities extending over said passage extensions each of said lubricant retainers having a top wall and a side wall which are structurally integral, said side wall having at least one opening therethrough near a bottom of the corresponding cavity.

2. A cross for a universal joint according to claim 1 wherein each of said passage extensions has a flange in the corresponding cavity and the side wall of the corresponding lubricant retainer contacts said flange.

3. A cross for a universal joint according to claim 2 wherein said opening is at least partially between said flange and an outer end of the corresponding cavity.

4. A cross for a universal joint according to claim 1 wherein each of said lubricant retainers has an outwardly-extending annular flange near a lower edge thereof which serves to center said retainer in the corresponding cavity.

5. A cross for a universal joint according to claim 1 wherein outer ends of said passage extensions have notches therein.

6. A cross for a universal joint comprising a body forming a trunnion extending therefrom, said trunnion having a cavity formed centrally in and end thereof with said cavity opening at an end of said trunnion and having a bottom spaced from the end of said trunnion, said body having a passage communicating with said cavity at the bottom thereof, tubular wall means extending from an end of said passage at an entrance to said cavity through a substantial portion of said cavity, a one-piece lubricant retainer in said cavity extending over said tubular wall means, said lubricant retainer having a side wall with at least one opening therethrough near the bottom of said cavity, and a top wall which is integral with said side wall.

7. A cross for a universal joint according to claim 6 wherein said tubular wall means has a flange near the bottom of said cavity and said lubricant retainer fits around said flange with said opening being at least partially between said flange and the end of said trunnion.

8. A cross for a universal joint according to claim 6 wherein said lubricant retainer has an outwardly-extending annular flange near a lower edge thereof which serves to center said retainer in the corresponding cavity.

9. A cross for a universal joint according to claim 6 wherein outer ends of said tubular wall means have notches therein adjacent ends of said lubricant retainers.

10. A universal joint comprising a cross having trunnions extending outwardly therefrom, a bearing cup rotatably mounted on each of said trunnions, each of said trunnions having a substantially cylindrical cavity formed therein communicating with the interior of the corresponding bearing cup, said cross having passages extending from a central portion thereof and communicating with each of said cavities, means for supplying lubricant to said passages, wall means extending through a substantial portion of each of said cavities and communicating with the passages of said cross, and a lubricant retainer extending over each of said wall means, each of said lubricant retainers having a top wall and a side wall of circular transverse cross section and which are structurally integral, said side wall having at least one opening therethrough toward a bottom of the corresponding cavity.

11. A universal joint according to claim 10 wherein each of said wall means has a flange near the bottom of the corresponding cavity, said lubricant retainer fitting around said flange, with said opening being positioned between said flange and an outer end of the corresponding trunnion.

12. A universal joint according to claim 10 wherein each of said side walls is smaller than the diameter of the corresponding cavity.

13. A universal joint according to claim 10 wherein each of said lubricant retainers has an outwardly-extending annular flange near a lower edge of the side wall which serves to center said retainer in the corresponding cavity.

14. A universal joint according to claim 13 wherein said opening is on the side of said flange toward an outer end of the corresponding cavity.

15. A universal joint according to claim 10 wherein each of said wall means has a notch at an end adjacent the top wall of the corresponding lubricant retainer.

16. A universal joint according to claim 15 wherein each of said wall means also has a notch at an other end opposite said adjacent end.

17. A universal joint according to claim 10 wherein each of said lubricant retainers has at least two diametrically-opposite openings extending through the side wall thereof toward the bottom of the corresponding cavity.

* * * * *

UNITED STATES PATENT AND TRADEMARK OFFICE
CERTIFICATE OF CORRECTION

PATENT NO. : 5,389,039
DATED : February 14, 1995
INVENTOR(S) : Philip J. Mazziotti It is certified that error appears in the above-identified patent and that said Letters Patent is hereby corrected as shown below:

Column 1, line 19, after "time" insert --,--.

Column 1, line 31, after "viscous" insert --,--.

Column 1, line 54, after "short" insert --.--.

Column 2, line 23, after "fitting" insert --,--.

Column 2, line 44, change "width" to --with--.

Column 3, line 37, after "Fig. 3" insert --,--.

Column 3, line 42, after "48" delete "S".

Column 3, line 51, change "3,832,86S" to --3,832,865--.

Column 4, line 21, after "event," insert --the--.

Column 4, line 30, after "flange" insert --54,--.

Column 5, line 7, after "Since" delete "S".

UNITED STATES PATENT AND TRADEMARK OFFICE
CERTIFICATE OF CORRECTION

PATENT NO. : 5,389,039
DATED : February 14, 1995
INVENTOR(S) : Philip J. Mazziotti It is certified that error appears in the above-identified patent and that said Letters Patent is hereby corrected as shown below:

Column 5, line 35, Claim 1, line 12, after "extensions"

insert --,--.

Column 5, line 57, claim 6, line 3, change "and" to --an--.

Signed and Sealed this

Eleventh Day of April, 1995

BRUCE LEHMAN

*Attest:*

*Attesting Officer*     Commissioner of Patents and Trademarks